(12) United States Patent
Schramm

(10) Patent No.: US 7,641,222 B2
(45) Date of Patent: Jan. 5, 2010

(54) METHOD AND APPARATUS FOR AIRBAG MODULE COVER ATTACHMENT

(75) Inventor: Michael R. Schramm, Perry, UT (US)

(73) Assignee: Autoliv ASP, Inc., Ogden, UT (US)

( * ) Notice: Subject to any disclaimer, the term of this patent is extended or adjusted under 35 U.S.C. 154(b) by 414 days.

(21) Appl. No.: 11/588,705

(22) Filed: Oct. 27, 2006

(65) Prior Publication Data

US 2008/0100039 A1  May 1, 2008

(51) Int. Cl.
*B60R 21/16* (2006.01)

(52) U.S. Cl. .................. 280/728.3; 280/728.2

(58) Field of Classification Search ............. 280/728.1, 280/728.2, 728.3
See application file for complete search history.

(56) References Cited

U.S. PATENT DOCUMENTS

| 5,354,093 | A | 10/1994 | Schenck et al. |
| 5,520,409 | A | 5/1996 | Saderholm |
| 5,678,850 | A | 10/1997 | Ricks et al. |
| 6,029,992 | A | 2/2000 | Vendely et al. |
| 6,565,113 | B2 | 5/2003 | Kassman et al. |
| 2005/0194768 | A1 | 9/2005 | Bonam et al. |

*Primary Examiner*—Eric Culbreth
(74) *Attorney, Agent, or Firm*—Sally J Brown; Madson IP, P.C.

(57) ABSTRACT

An airbag module is disclosed. The airbag module has an airbag cover that has a front surface. The cover also includes a plurality of latch hooks that extend away from the front surface. Each of the latch hooks includes a retention flange. A support plate is also included as part of the airbag module and is attached to the airbag cover. The support plate includes a plurality of slots. Each latch hook (of the cover) passes through a separate slot in the support plate. The slots are sized such that for each latch hook passed through a slot, a gap is formed between the retention flange of each latch hook and a shoulder of the support plate. A locking member that engages the plurality of latch hooks is also added to the airbag module. At least a portion of the locking member is disposed within the slot. The locking member, once positioned in the slot, engages the latch hooks and causes the retention flange to overlap the shoulder of the support plate.

14 Claims, 6 Drawing Sheets

METHOD AND APPARATUS FOR AIRBAG MODULE COVER ATTACHMENT

BACKGROUND OF THE INVENTION

Inflatable safety restraint devices, or "airbag restraints," are mandatory on most new vehicles. Airbag restraints commonly contain a collision sensor, an inflator, and an inflatable airbag. In the event of an accident, the collision sensor within the vehicle, such as an accelerometer, measures abnormal deceleration and triggers the inflator. The inflator is connected to the one or more airbags positioned within the vehicle. Upon receipt of the signal from the collision sensor, the inflator rapidly produces a quantity of inflation fluid or gas which fills the airbag and protects the passenger from harmful impact with the interior of the vehicle.

Although airbag systems greatly enhance the overall safety of a vehicle, these systems are often visually unappealing and do not match other portions of the vehicle's décor. Accordingly, vehicle manufactures have developed airbag covers that go over the top of the airbag system to prevent the airbag system from being viewed by the occupant. In general, these covers are positioned on the vehicle's steering wheel, dashboard, and/or other locations in the vehicle having an installed airbag. These covers are typically made of a thermoplastic material and will generally correspond to other portions of the décor of the vehicle. During deployment of the airbag, all or a portion of the cover will open to allow the deploying airbag to become positioned in the proper position within the interior of the vehicle. Thus, by positioning an airbag cover over the top of the airbag system, the vehicle occupant will still enjoy the benefits of the airbag system, but at the same time, will have a vehicle interior that is visually appealing.

As is recognized by those skilled in the art, it is necessary to secure the airbag cover to the vehicle to ensure that the deployment of the airbag does not separate the airbag cover from the vehicle. The reason for securing the cover to the vehicle is self-evident: if the airbag cover did, in fact, separate from the vehicle during deployment, the forces associated with deployment could propel the cover into the vehicle interior towards the vehicle occupant.

Airbag and vehicle manufacturers go to great lengths to ensure that the airbag cover does not separate from the vehicle during deployment. In some prior art systems, this may involve attaching, via rivets, bolts, screws, etc., the airbag cover to another portion of the airbag system (such as the airbag container).

Another prior art system for securing the airbag cover to the airbag system is disclosed in U.S. Pat. No. 5,354,093 (which patent is incorporated herein by reference and is referred to as the "'093 patent"). The '093 patent attaches the airbag cover through a plurality of "latch hooks" that engage one or more "latch surfaces" on the airbag system. The latch hooks hold and retain the airbag cover during deployment of the airbag. By using these latch hooks, the '093 patent operates to attach the airbag cover without the need for rivets or other fasteners. Accordingly, the '093 patent teaches a means for attaching the airbag cover to the airbag system that is simple and inexpensive to use.

Although the means for attaching an airbag cover taught in the '093 patent has its advantages, this attachment system may not provide sufficient retention of the airbag cover during a severe, violent crash. The reason for this is that the engagement between the latch hooks and the latch surfaces may, in some situations, lack the strength necessary to withstand the strong forces associated with a violent vehicle crash.

A further attachment mechanism is disclosed in U.S. Patent Application Publication No. 2005/019768 (which is incorporated herein by reference and will be referred to as the "'768 application"). The '768 application holds and retains the airbag cover in the proper position through the use of a two plates or "plate-like members" that retain an airbag cover in the proper location. While the use of this system does retain the airbag cover, the construction of these multiple plates can be costly.

Accordingly, a new apparatus for attaching an airbag cover to a vehicle is needed. This new attachment mechanism will be, like the '093 patent and the '768 application, easy to use, yet at the same time, will operate to secure the airbag cover to the airbag system during crashes that cause other systems to fail. Such a new system/apparatus is disclosed herein.

BRIEF SUMMARY OF THE INVENTION

As described in the claims, the present embodiments relate to an airbag module. The airbag module has an airbag cover that has a front surface. The cover also includes one or more latch hooks that extend away from the front surface. Each of the latch hooks comprises a retention flange. A support plate is also included as part of the airbag module. The support plate is attached to the airbag-cover. The support plate includes one or more of slots. Each latch hook (of the cover) will pass through a separate slot in the support plate. The slots are sized such that for each latch hook passed through a slot, a gap is formed between the retention flange of each latch hook and a shoulder of the support plate. In general, this will occur by having the slot be wider than the widest portion of the retention flange (of the latch hook). A ring-shaped locking member that engages the plurality of latch hooks is also added to the airbag module. At least a portion of the locking member is disposed within the slot and causes the retention flange to overlap the shoulder of the support plate.

An airbag may also be added to the airbag module. The airbag is disposed within a chamber formed by the airbag cover. The airbag deploys through the front surface of the cover. In other embodiments, an inflator will be added to the module. The inflator is attached to the support plate and prevents the locking member from disengaging from the latch hooks.

The present embodiments also describe a method for retaining an airbag cover as part of an airbag module. In this method, an airbag cover is obtained. This airbag cover has a front surface and a plurality of latch hooks that extend away from the front surface. Each latch hook comprises a rear surface and a retention flange. A support plate is also positioned as part of the method. The support plate is attached to the airbag cover. The support plate includes a plurality of slots. Each latch hook is then passed through a separate slot. The slots are sized such that for each latch hook passed through a slot, a gap is formed between the retention flange of each latch hook and a shoulder of the support plate. Each of the latch hooks are then engaged with a ring-shaped locking member. This engagement between the locking member and the latch hooks causes the retention flange to overlap the shoulder of the support plate and prevents the cover from separating from the support plate.

The present embodiments have been developed in response to the state of the art. Accordingly, the present embodiments relate to a new airbag module that retains the airbag cover, as well as methods for retaining the airbag cover. In general, the present embodiments will include an airbag module designed such that it may be used as part of a frontal airbag system mounted in the steering wheel or dashboard of the vehicle.

The airbag module will include an airbag cover that is positioned in front of an airbag. The cover will have a front surface that will be visible to the vehicle occupant once the airbag module has been positioned in the vehicle. In the event of an accident or crash the airbag will deploy through the front surface and become positioned within the vehicle interior. The front surface will be generally finished and/or constructed to match the décor of the vehicle interior.

The airbag cover includes one or more latch hooks that extend away (rearward) from the front surface. Each of the latch hooks comprises a retention flange. The latch hooks and the retention flanges are designed to secure the cover to the airbag module and prevent the cover from separating from the vehicle structure.

A support plate is also added to the airbag module. The support plate is attached to the cover. The support plate is also designed to attach/secure an inflator to the airbag module. The inflator is attached to the support plate via one or more fasteners. The support plate includes one or more slots. The number of slots may correspond to the number of latch hooks in the cover. Each latch hook is designed to pass through a separate slot.

A locking member is also added to the airbag module. The locking member may be ring-shaped, or in other embodiments, may have other shapes/configurations. The locking member will generally be positioned between the support plate and the inflator. The locking member is designed such that it will engage the latch hooks, after the latch hooks have been passed through the slots. In some embodiments, the locking member will comprise guides, prongs, or other similar other engaging features. However, in other embodiments, the locking member will not have such features.

The diameter/size of the slots is generally larger than the size of the latch hook. Accordingly, when the latch hook is passed through the slot, a gap is formed between the retention flange and the shoulder of the support plate. The presence of the gap between the retention flange and the shoulder means that latch hook and retention flange can easily pass through the slot, without or with minimal deflection, movement, bending, or other deformation in order to fit through the slot. Moreover, because there is a gap between the retention flange and the shoulder, initially there is no engagement or overlap between the retention flange and the shoulder.

Once the latch hooks have been passed through the slots, the locking member is then positioned as part of the airbag module. The locking member is designed such that a portion of the locking member may fit into the slots. As the locking member is positioned in the slot, the locking member contacts/engages the latch hooks. In turn, this engagement between the locking member and the latch hooks pushes the latch hook and the retention flange outwardly towards the shoulder. Once the latch hooks have moved outwardly, the retention flanges (which are positioned on the latch hooks) overlap the shoulder of the support plate. This overlap between the retention flange and the shoulder secures the cover in the proper position and prevents the cover from separating from the support plate.

Additional embodiments of the locking member are also possible. For example, embodiments may be constructed in which the locking member will be secured, via fasteners and the like, to the support plate. Further embodiments may be designed in which the locking member comprises one or more prongs that are designed to fit into the slots. Yet further embodiments of the locking member may be designed in which the locking member is held in its proper position by the inflator.

In yet additional embodiments of the locking member, the locking member comprises a ring-shaped structure that is designed to fit into a notch (or other similar feature) in the latch hooks. This ring-shaped structure may (or may not) fit into a portion of the slot. In such embodiments, the airbag module is designed such that the latch hook is passed through a slot such that a gap is formed between the retention flange and the shoulder of the support plate. However, once the latch hook has been passed through the slot, the locking member is brought into engagement with the latch hook. This occurs by positioning the locking member in the notch found in each latch hook. Such positioning of the locking member exerts a lateral force on and moves the latch hook outward toward the shoulder and eliminates the gap between the retention flange and the shoulder of the support plate. Accordingly, the latch hooks are immobilized in a position that engages a shoulder of the support plate, thereby securing the airbag cover. In other words, the retention flange of the latch hooks overlaps the shoulder and prevents the cover from separating from other portions of the airbag module.

BRIEF DESCRIPTION OF THE SEVERAL VIEWS OF THE DRAWINGS

In order that the manner in which the above-recited and other features and advantages of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the present embodiments, as represented in the Figures, is not intended to limit the scope of the invention, as claimed, but is merely representative of presently preferred embodiments of the invention.

Figure 1:
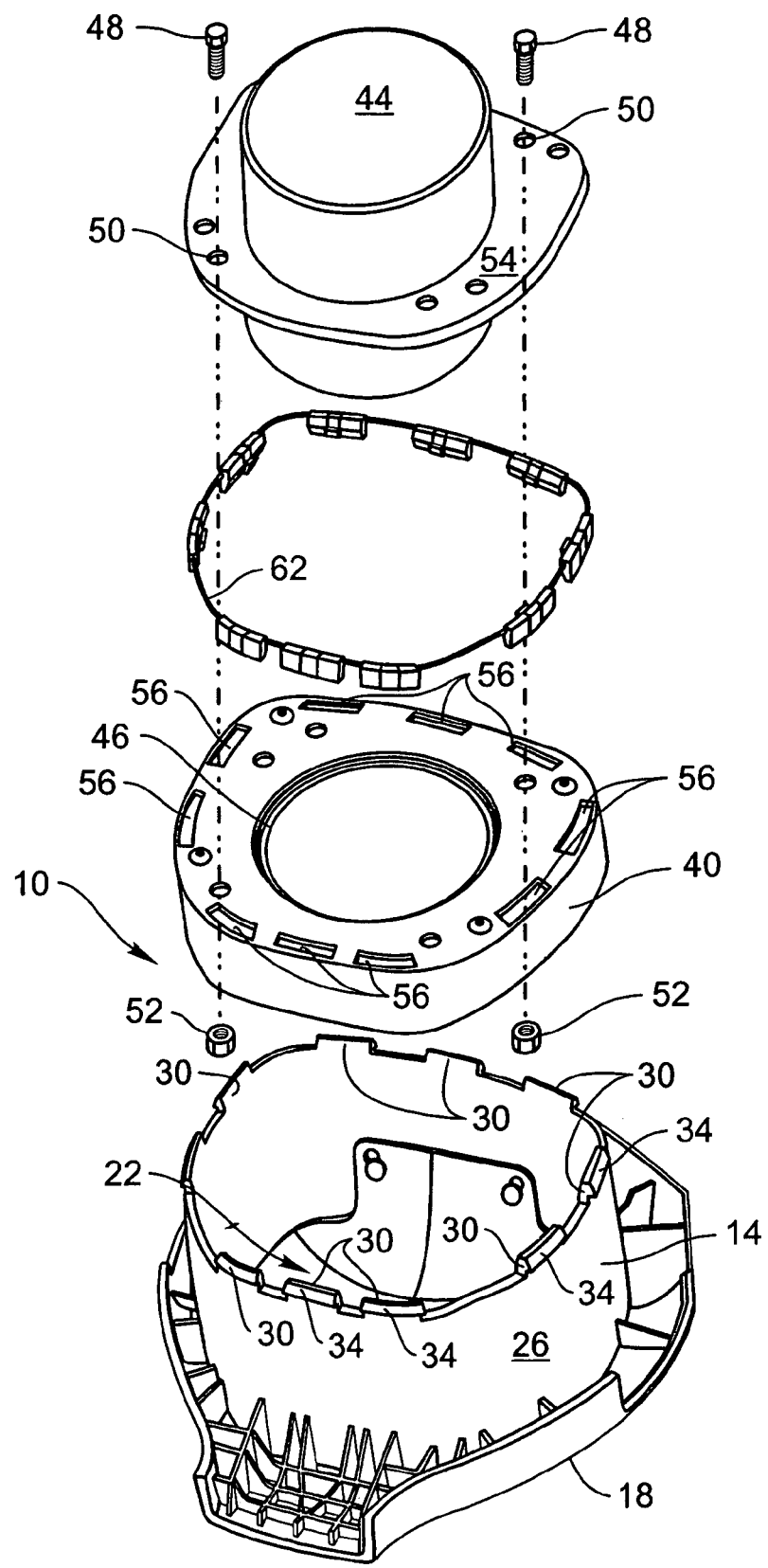
FIG. 1 is an exploded assembly view of one embodiment of an airbag module.

Referring now to FIG. 1, a perspective view illustrates an airbag module 10 according to the present embodiments. The airbag module 10 is designed such that it may be mounted into a vehicle interior as part of the vehicle's airbag system(s). The airbag module 10 is generally designed such that it may be used as part of a frontal airbag system mounted in the steering wheel or dashboard of the vehicle. However, the airbag module 10 may also be used as part of other types of airbag system(s) as well. For ease of description, the airbag module 10 shown throughout the drawings is a steering wheel mounted airbag system.

In general, the airbag module 10 will comprise an airbag cover 14. The airbag cover 14 may be made of thermoplastic or other suitable materials. The cover 14 is designed such that it will be positioned over an airbag (not shown in FIG. 1). The cover 14 will generally have a front surface 18 that will be visible to the vehicle occupant once the airbag module 10 has been positioned in the vehicle. Accordingly, the front surface 18 will generally be a "Class A" surface and will be visually appealing and/or will match the aesthetics of the vehicle interior.

The airbag module 10 is designed such that a chamber 22 is positioned behind the front surface 18. The chamber 22 is a cleft or volume into which an airbag is positioned and stowed during normal use of the vehicle. In general, the chamber 22 will be defined by an encircling wall 26 that extends rearward from the front surface 18.

The airbag module 10 is designed such that the airbag will be stowed in the chamber 22. However, in the event of an accident or crash, the airbag will deploy through the front surface 18 (such as through a tear seam in the front surface 18) and become positioned within the vehicle interior, thereby preventing the occupant from harmfully impact with the steering wheel, the dashboard, and/or other portions of the vehicle interior.

One or more latch hooks 30 that extend away from the front surface 18 are also added to the cover 14. As shown in FIG. 1, the latch hooks 30 are attached to the encircling wall 26 and are positioned such that the latch hooks 30 are located around the perimeter of the chamber 22. Other embodiments may also be constructed in which the latch hooks 30 are connected directly to the front surface 18. Each of the latch hooks 30 comprises a retention flange 34. As described in greater detail herein, the latch hooks 30 and the retention flanges 34 are designed to secure the cover 14 and prevent the cover 14 from separating from the vehicle structure during deployment of the airbag (not shown).

The airbag module 10 of the present embodiments also includes a support plate 40 that may be attached to the cover 14. The support plate 40 is preferably made of metal or any other suitable material and is designed to hold and retain the airbag. The support plate 40 is also designed to attach/secure an inflator 44 to the airbag module 10. In order to accommodate the inflator 44, an opening 46 may be added to the center of the support plate 40. In general, the opening 46 will be sized and positioned such that all or a portion of the inflator 44 may fit into the opening 46.

As shown in FIG. 1, the inflator 44 will be attached to the support plate 40 via one or more fasteners 48 (such as bolts, screws, etc.). As needed, one or more nuts 52 (or other fastener retainers) may also be used. As shown in FIG. 1, the fasteners 48 are designed to pass through fastener openings 50 that are positioned in a flange 54 of the inflator 44.

The support plate 40 attaches to the cover 14 via one or more slots 56 that are within the support plate 40. Each of the latch hooks 30 is designed to pass through a separate slot 56. Accordingly, the size, position and orientation of the slots 56 are designed such that they will accommodate the latch hooks 30.

A generally ring-shaped locking member 62 is also added to the airbag module 10. The locking member 62 will be positioned between the support plate 40 and the inflator flange 54. The locking member 62 is designed such that it will engage the latch hooks 30, after the latch hooks have been passed through the slots 56. The locking member 62 immobilizes the cover 14 and prevents the cover 14 from disengaging from the support plate 40.

Figure 2:
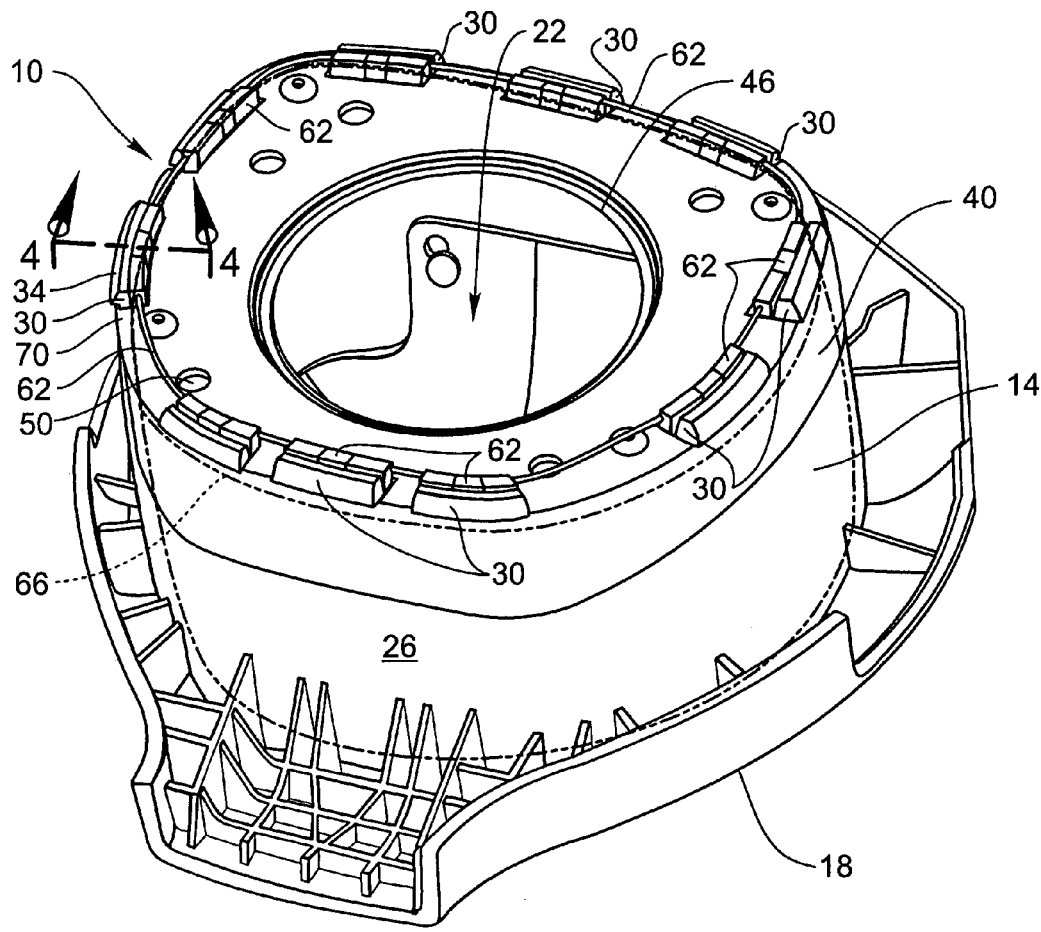
FIG. 2 is a perspective view of the embodiment of FIG. 1 which has been assembled wherein the inflator of the embodiment of FIG. 1 is not shown for drawing clarity.

Referring now to FIG. 2, a perspective view illustrates the airbag module 10 of FIG. 1, after the module 10 has been fully assembled. However, for purposes of clarity, the inflator 44 has been removed. As shown in FIG. 2, an airbag 66 is positioned within the chamber 22. As further shown in FIG. 2, the latch hooks 30 have been passed through the slots 56 and have been engaged by the locking member 62. The locking member 62 is generally positioned interior of the latch hooks 30 in this embodiment, but a person of ordinary skill in the art would understand how the locking member 62 could be disposed exterior to the latch hooks 30.

In the embodiment shown in FIG. 2, the locking member 62 comprises a plurality of guides 68 (shown in FIG. 4) that contact/engage the latch hooks 30. In general, these guides 68 push the latch hooks 30 outward and cause the retention flange 34 (which is positioned on the end of the latch hooks 30) to overlap a shoulder 70 of the support plate 40. In general, it is this overlap between the retention flange 34 and the shoulder 70 in combination with being immobilized by the locking member 62 that retains the cover 14.

Figure 3:
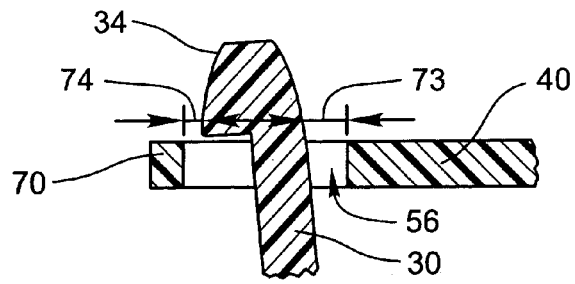
FIG. 3 is a cross-sectional view of the embodiment of FIG. 1 along the line 4-4 prior to the locking member being added to the airbag module.
Figure 4:
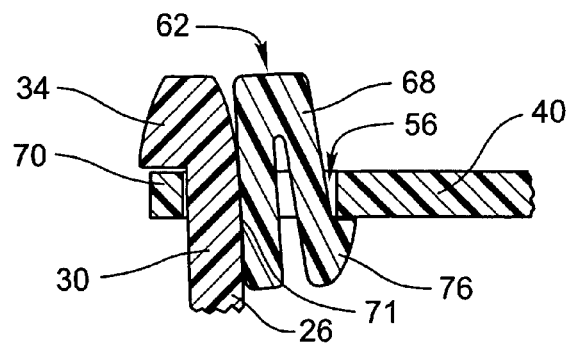
FIG. 4 is a cross-section view of the of the embodiment of FIG. 1 along the line 4-4 after the locking member being added to the airbag module.

FIGS. 3 and 4 are cross-sectional views that illustrate the way in which the latch hooks 30, the slots 56 and the locking member 62 operate to retain the cover. FIG. 3 shows the way in which the latch hooks 30 are passed through the slots 56 is illustrated. More specifically, FIG. 3 is a cross-sectional view of the latch hook 30 as it is being passed through a slot 56 in the support plate 40 prior to the addition of the locking member 62.

As can be seen in FIG. 3, the slot 56 is larger than the latch hook 30/retention flange 34. Accordingly, when the latch hook 30 is passed through the slot 56, a gap 74 (or opening) is formed between the retention flange 34 and the shoulder 70 of the support plate 40. This gap may be formed by making the slot 56 wider (larger) than the widest (largest) portion of the retention flange 34. The presence of the gap 74 between the retention flange 34 and the shoulder 70 means that latch hook 30 and retention flange 34 can easily pass through the slot 56, without force (or with minimal force). In some embodiments, the latch hook 30/retention flange 34 may pass through the slot 56 without being required to deflect, move, bend, or otherwise deform in order to fit through the slot 56. However, in other embodiments, some deflection may be required. Moreover, because there is a gap 74 between the retention flange 34 and the shoulder 70, there may be no engagement or overlap between the retention flange 34 and the shoulder 70. A rear gap 73 may also be formed between the rear surface of the latch hook 30 and the support plate 40.

FIG. 4 is a cross-sectional view that illustrates the addition of the locking member 62 after the latch hooks 30 have been passed through the slots 56. As shown in FIG. 4, a portion of the locking member 62 (i.e., the guides 68) are designed to fit into a portion of the slot 56. One or more clips 76 may also be added to the guides 68 to further hold the guide 68 in the slot 56. Such positioning of the guides 68 in the slot 56 causes the locking member 62 to contact a rear surface 71 of the hooks 30, thereby pushing the latch hook 30 and the retention flange 34 outwardly towards the shoulder 70 such that the retention flange 34 overlaps the shoulder 70. This overlap between the retention flange 34 and the shoulder 70 secures the cover 14 in the proper position and prevents the cover 14 from separating from the support plate 40.

As shown in FIG. 4, the introduction of the locking member 62 exerts a lateral force which pushes against the latch hook 30 and causes the retention flange 34 to overlap a portion of the shoulder 70. In some embodiments, all or a portion of the locking member 62 will fit into a portion of the slot 56 (such as into the rear gap 73 that is shown in FIG. 3). By fitting into the rear gap 73, the locking member 30 immobilizes the latch hook 30/retention flange 34 and secures the airbag cover 14. In other embodiments, the locking member 62 will not fit into a portion of the slot 56; rather, in these embodiments, the locking member 62 will simply exert a lateral force on the locking member latch hook 30/retention flange 34 that ensures that the retention flange 34 overlaps the shoulder 70.

Figure 10:
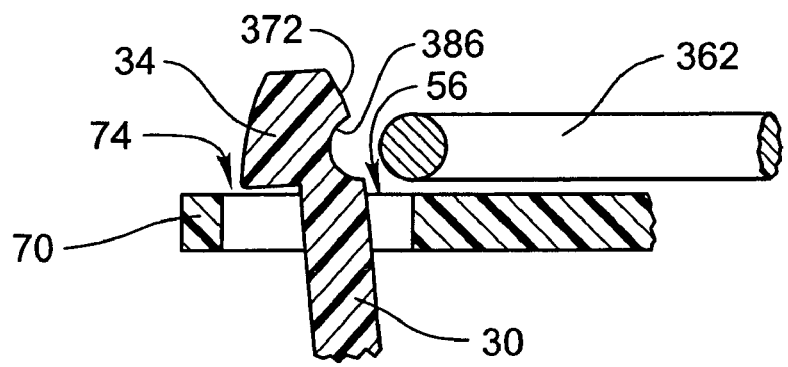
FIG. 10 is a cross-sectional view of an airbag module that may be used in conjunction with the embodiment of the locking member shown in FIG. 9 in an unengaged position.

It should be noted that when the locking member engages the latch hook(s), the locking member will effectively fill the gap. As used herein, the term "effectively fill" the gap means that the locking member will either become positioned in the slot, or will exert a lateral force that pushes against the latch hook and prevents the latch hook from disengaging. Thus, in some embodiments, the term "effectively fill" the gap will mean that a portion of the locking member becomes positioned in the slot. In other embodiments, the term "effectively fill" the gap means that the locking member applies a lateral force, toward the shoulder 70 and eliminates the gap 74 (as shown in FIG. 10).

Figure 5:
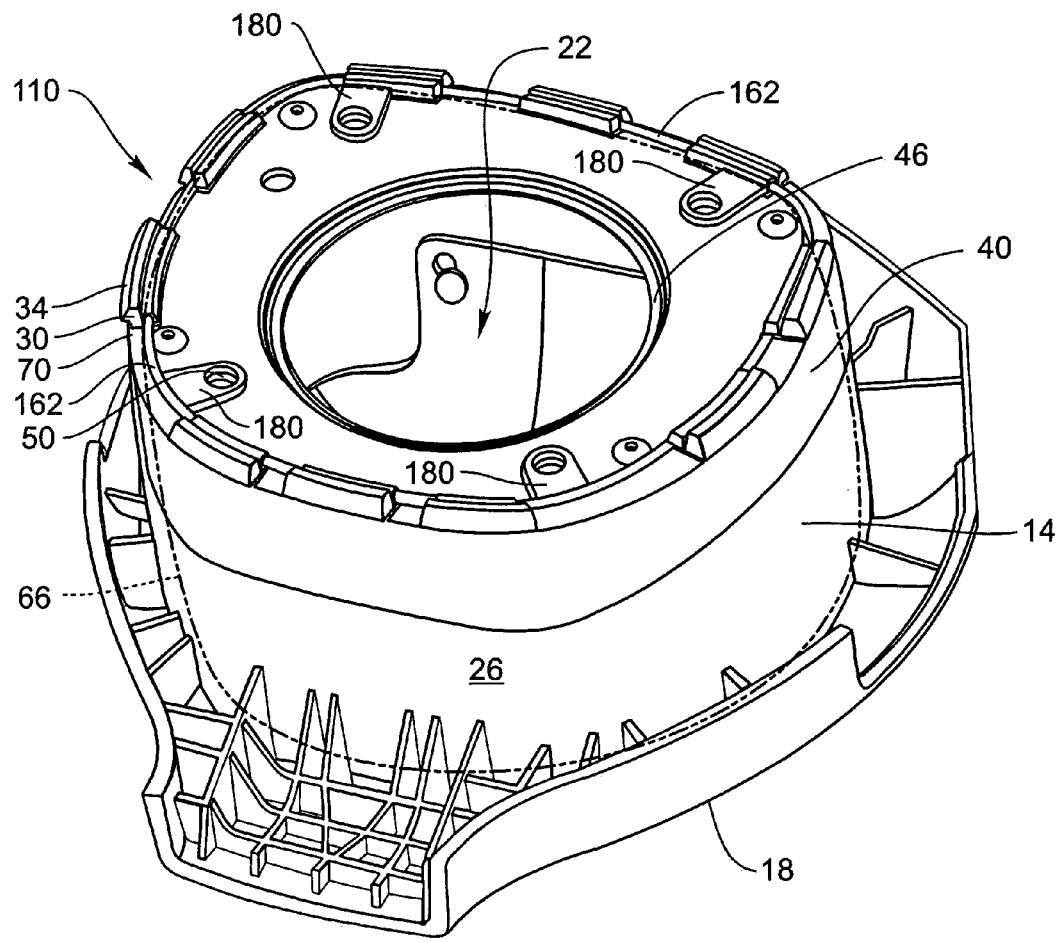
FIG. 5 is a perspective view of another embodiment of an airbag module that has been assembled.

Referring now to FIG. 5, an assembled view of an airbag module 110 is illustrated. (FIG. 5 is similar to the view shown above in FIG. 2). The airbag module 110 is similar to the module 10 discussed above in FIGS. 1-4. The principal difference between the airbag module 110 and the module 10 is that the module 110 includes a second embodiment of a ring-shaped locking member 162. The locking member 162 differs from the locking member 62 discussed above in that this locking member 162 includes one or more fastener tabs 180 that are designed to receive the fasteners 48 (shown in FIG. 1) that operate to attach the inflator 44 (shown in FIG. 1). By passing the fasteners 48 through the fastener tabs 180, the locking member 162 becomes affixed to the support plate 40. In some embodiments, this "affixing" of the locking member 162 to the support plate 40 increases the overall rigidity of the module 110 and ensures that the cover 14 becomes immovable once the locking member 162 is positioned.

Figure 6:
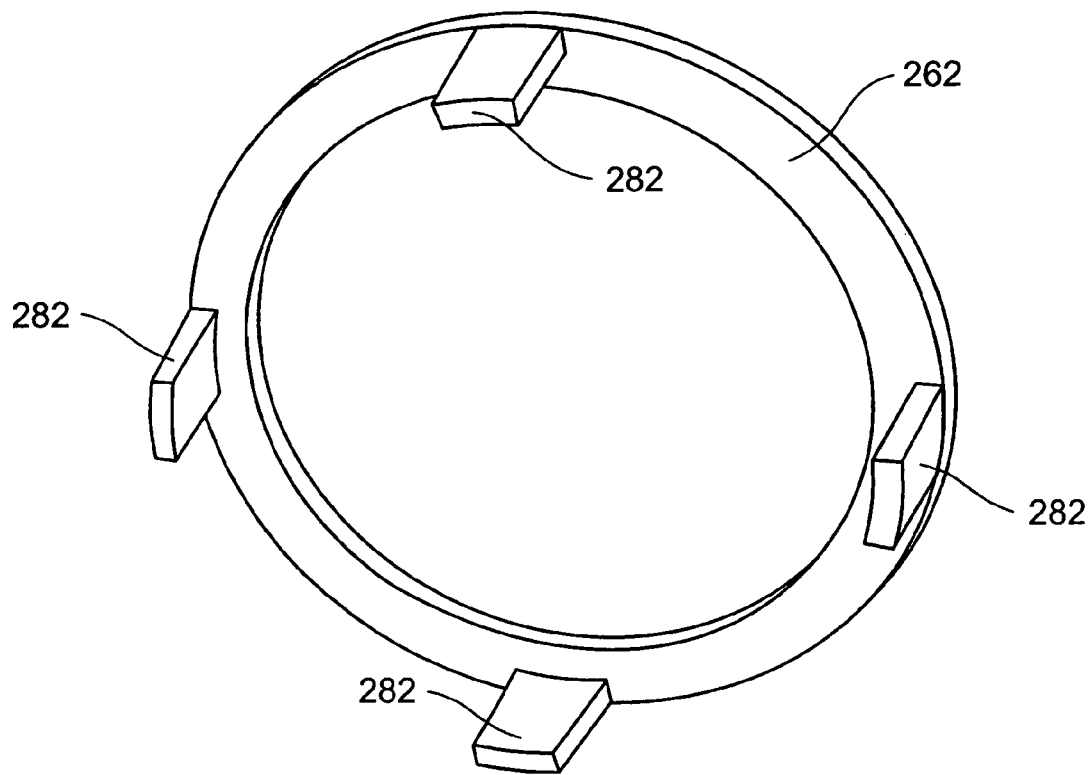
FIG. 6 is a perspective view of another embodiment of a locking member that may be used in an airbag module.

Referring now to FIG. 6, a perspective view illustrates an additional embodiment of a ring-shaped locking member 262 that may be used in conjunction with any of the airbag modules (including modules 10, 110) discussed herein. The locking member 262 is similar to the locking members 62, 162 discussed above. However, unlike the embodiments of the locking members 62, 162, the locking member 262 does not include one or more guides 68. Rather, the locking member 262 includes one or more prongs 282 that are designed to fit into the slots 56.

Figure 7:
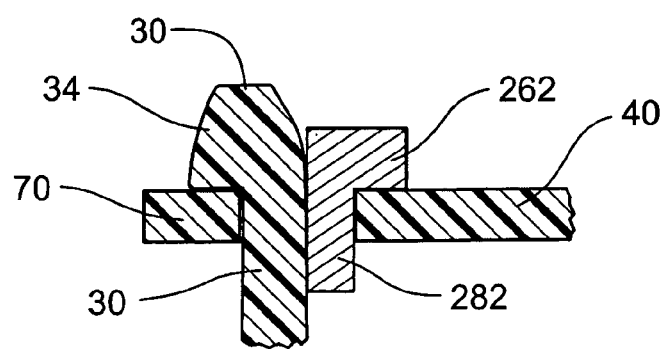
FIG. 7 is a cross-sectional view of an airbag module that incorporates the embodiment of the locking member shown in FIG. 6.

Referring now to FIG. 7, a cross-sectional view illustrates the use of the locking member 262 in conjunction with a support plate 40 and the latch hooks 30. As shown in FIG. 7, the latch hooks 30 pass through the slots 56 (to form a gap, in the manner discussed above). When the locking member 262 is added, the prongs 282 fit into the slot 56 and engage the latch hooks 30. In turn, this engagement between the latch hooks 30 and the prongs 282 moves the latch hooks 30 outward (i.e., towards the shoulder 70) and causes the retention flange 34 to overlap the shoulder 70.

Figure 8:
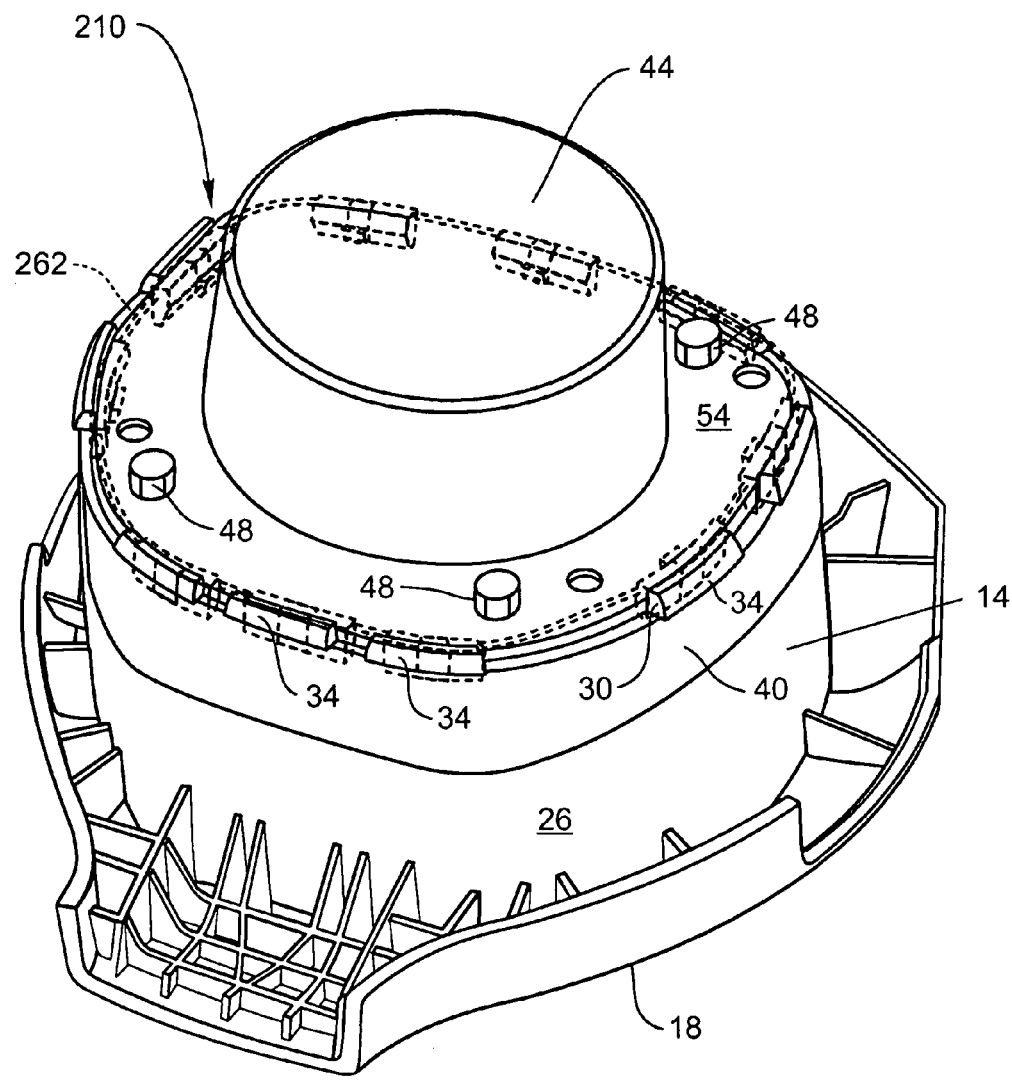
FIG. 8 is a perspective view that shows the airbag module of FIG. 7 after an inflator has been added.

Referring now to FIG. 8, a perspective view shows an embodiment of an airbag module 210 that incorporates the locking member 262 discussed in conjunction with FIGS. 6 and 7. In the embodiment of FIG. 8, an inflator 44 is shown added to the module 210. The inflator 44 covers the locking member 262 and holds the locking member 262 in the proper position. Such positioning of the inflator 44 prevents the locking member 262 from disengaging from the latch hooks 30 and secures the cover 14 to the airbag module 210.

Figure 9:
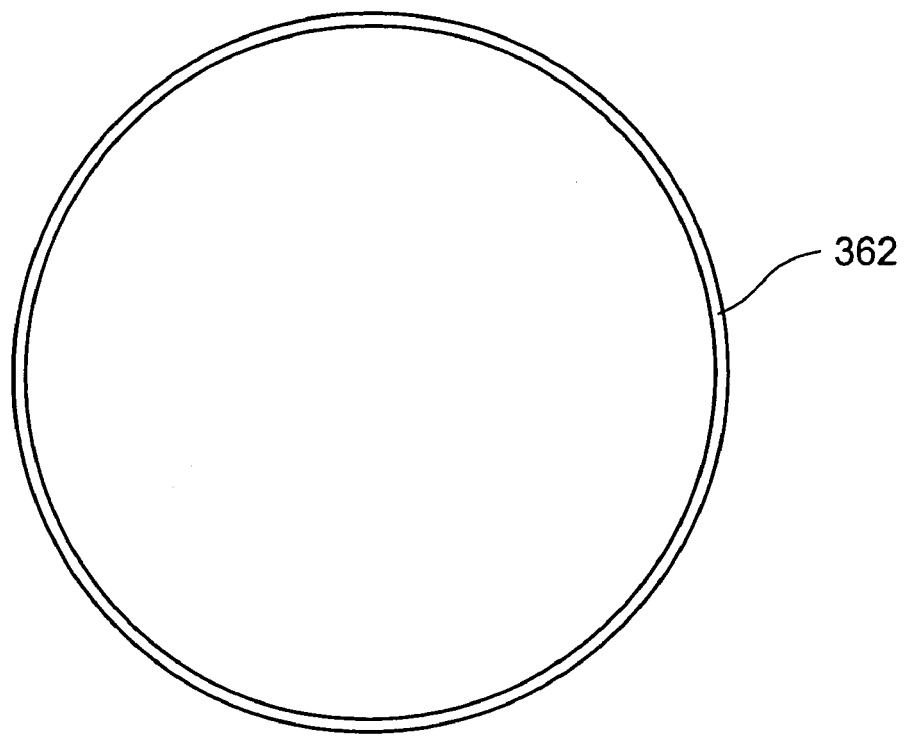
FIG. 9 is a perspective view of a further embodiment of a locking member.

Referring now to FIG. 9, an additional embodiment of a ring-shaped locking member 362 is illustrated. As with the other embodiments, described herein, the ring-shaped locking member 362 is designed for use with the airbag modules described herein (including modules 10, 110, 210, etc.). Unlike the previous embodiments, the locking member 362 does not have any guides, flanges, or other similar features that will occupy a portion of the slots 56. Rather, the locking member 362 is simply a ring (or ring-shaped structure) that engages the latch hooks 30 (not shown in FIG. 9) and prevents the cover 14 (not shown in FIG. 9) from separating from other portions of an airbag module.

Figure 11:
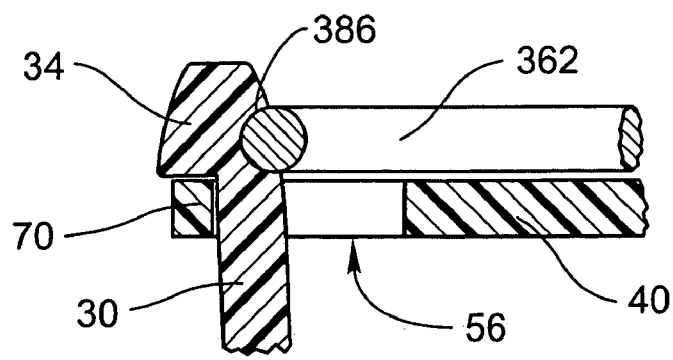
FIG. 11 is a cross-sectional view of the embodiment of the airbag module of FIG. 10 that includes the locking member of FIG. 9 in an engaged position.

FIGS. 10 and 11 are cross-sectional views that illustrate the way in which the locking member 362 of FIG. 9 may be used to engage a latch hook 30. Specifically, FIG. 10 is a cross-sectional view that illustrates the latch hook 30 having been passed through a slot 56. As shown in FIG. 10, when the latch hook 30 is passed through the slot 56, a gap 74 is formed between the retention flange 34 and the shoulder 70 of the support plate 40. Although the locking member 362 is illustrated in FIG. 10, there is no engagement between the locking member 362 and the latch hook 30; rather, the locking member 362 is being positioned for engagement.

In the embodiment shown in FIG. 10, the latch hook 30 comprises a notch 386 that is positioned on a rear surface 372 of the latch hook 30. More than one notch 386 may also be used to receive more than one locking member 362. The notch 386 is designed to receive the locking member 362.

Referring now to FIG. 11, a cross-sectional view illustrates the engagement between the latch hook 30 and the locking member 362. Specifically, the locking member 362 will fit into the notch 386 in the latch hook 30. In turn, this engagement between the latch hook 30 and the locking member 362 moves the latch hook 30 outward, using a lateral force, toward the shoulder 70 and eliminates the gap 74 (shown in FIG. 10). Such elimination of the gap 74 also causes the retention flange 34 to overlap the shoulder 70 and prevents the cover 14 (not shown in FIG. 11) from separating from other portions of the airbag module.

Referring now to FIGS. 1 through 11 collectively, those of skill in the art will readily appreciate the present embodiments also describes a method through which an airbag cover 14 may be retained as part of an airbag module. This method will generally involve obtaining a cover 14 and then positioning the support plate 40 into attachment with the airbag cover 40. Once the support plate 40 has been positioned, each of the latch hooks 30 are passed through a separate slot 56 such that a gap 74 is formed between the retention flange 34 of each latch hook 30 and a shoulder 70 of the support plate 40. Once the gap 74 has been formed, the latch hooks 30 are then engaged by one of the ring-shaped locking member(s) described herein. This engagement between the locking member and the latch hooks 30 causes the retention flange 34 to overlap the shoulder 70 of the support plate 40 and prevents the cover 14 from separating from the support plate 40.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

The invention claimed is:

1. An airbag module comprising:
    an airbag cover having at least one latch hook, wherein each latch hook comprises a retention flange;
    a support plate attached to the airbag cover, the support plate comprising at least one slot, wherein each latch hook passes through a slot, thereby forming a gap between the latch hook and the slot; and
    a locking member that engages the latch hook, wherein the locking member effectively fills the gap and causes the retention flange to overlap the shoulder of the support plate.

2. The airbag module of claim 1 further comprising an airbag disposed within a chamber formed by the airbag cover, wherein the airbag deploys through a front surface.

3. The airbag module of claim 1 further comprising an inflator attached to the support plate, wherein the inflator prevents the locking member from disengaging from the latch hooks.

4. The airbag module of claim 1 wherein the cover becomes immovable once the locking member effectively fills the gap.

5. The airbag module of claim 1 wherein the locking member is ring-shaped and comprises at least one guide for disposition in the slot.

6. The airbag module of claim 5 wherein the guide further comprises a clip extending therefrom, the clip for engaging the support plate.

7. The airbag module as in claim 5 wherein the locking member is attached to the support plate via at least one fastener.

8. The airbag module as in claim 1 wherein the latch hook comprises a notch that is positioned on a rear surface of the latch hook, and wherein the locking member seats in the notch in the latch hook.

9. The airbag module as in claim 1 wherein the latch hook is not deflected when it is passed through the slot.

10. The airbag module as in claim 1 wherein the gap is effectively filled by positioning at least a portion of the locking member within the slot.

11. A method for retaining an airbag cover, the method comprising:
    obtaining an airbag cover, the cover having at least one latch hook, wherein each latch hook comprises a rear surface and a retention flange;
    positioning a support plate to engage the airbag cover, the support plate comprising at least one slot,
    passing each latch hook through a slot to form a gap between the latch hook and the slot; and
    engaging the latch hook with a locking member, wherein the engagement between the locking member and the latch hook effectively fills the gap and causes the retention flange to overlap the shoulder of the support plate and prevents the cover from separating from the support plate.

12. A method as in claim 11 wherein the gap is effectively filled by positioning at least a portion of the locking member within the slot.

13. A method as in claim 11, further comprising the step of positioning an airbag in a chamber formed by the airbag cover.

14. A method as in claim 11, further comprising the step of attaching an inflator to the support plate.

* * * * *